United States Patent
Hogreve et al.

(10) Patent No.: US 11,898,938 B2
(45) Date of Patent: Feb. 13, 2024

(54) METHOD AND SYSTEM, USING A COLORIMETRIC INDICATOR, FOR DETECTING A POSSIBLE LOSS OF INTEGRITY OF A FLEXIBLE BAG FOR BIOPHARMACEUTICAL PRODUCT

(71) Applicant: SARTORIUS STEDIM FMT SAS, Aubagne (FR)

(72) Inventors: Marc Hogreve, Adelebsen (DE); Martin Dahlberg, Bovenden (DE)

(73) Assignee: SARTORIUS STEDIM FMT SAS, Aubagne (FR)

( * ) Notice: Subject to any disclaimer, the term of this patent is extended or adjusted under 35 U.S.C. 154(b) by 214 days.

(21) Appl. No.: 17/593,913

(22) PCT Filed: Mar. 20, 2020

(86) PCT No.: PCT/EP2020/057801
§ 371 (c)(1),
(2) Date: Sep. 28, 2021

(87) PCT Pub. No.: WO2020/200841
PCT Pub. Date: Oct. 8, 2020

(65) Prior Publication Data
US 2022/0178782 A1    Jun. 9, 2022

(30) Foreign Application Priority Data

Apr. 2, 2019   (EP) .................................... 19166716

(51) Int. Cl.
*G01M 3/04*   (2006.01)
*G01M 3/38*   (2006.01)

(52) U.S. Cl.
CPC .............. *G01M 3/042* (2013.01); *G01M 3/38* (2013.01)

(58) Field of Classification Search
CPC ................................. G01M 3/042; G01M 3/38
See application file for complete search history.

(56) References Cited

U.S. PATENT DOCUMENTS

| 5,309,750 A | 5/1994 | Riley |
| 2003/0079482 A1* | 5/2003 | Voute ...................... F25D 25/00 62/343 |

(Continued)

FOREIGN PATENT DOCUMENTS

EP    2238425 A1    10/2010

OTHER PUBLICATIONS

International Search Report and Written Opinion of the International Searching Authority for International Application No. PCT/EP2020/057801 dated Jun. 24, 2020.

(Continued)

*Primary Examiner* — David Z Huang
(74) *Attorney, Agent, or Firm* — Heslin Rothenberg Farley & Mesiti P.C.; Victor A. Cardona, Esq.

(57) ABSTRACT

Integrity of a flexible bag already filled with a biopharmaceutical fluid is verified by a receiving and controlling device. The first wall and a second wall, forming two opposite walls on both sides of a longitudinal axis of the bag, are in contact with the fluid and with two parallel restraining plates of the device, while test pressure is controlled. Additionally, an integrity/non-integrity indicator device that comprises a pair of covering walls is provided to be interposed between the bag walls and the restraining plates. A leak through the bag walls can be detected by a color change of at least one continuous colorimetric detection layer, integral with or included in the pair of covering walls. Such continuous colorimetric detection layer is included in a permeable or impregnable layer.

15 Claims, 5 Drawing Sheets

(56) References Cited

U.S. PATENT DOCUMENTS

2015/0375914 A1* 12/2015 Voute .................... B65D 79/02
436/1
2018/0087997 A1* 3/2018 Thenard .................... A61J 1/18

OTHER PUBLICATIONS

European Search Report and Search Opinion for European Application No. 19166716 completed on Oct. 14, 2019.
International Preliminary Report on Patentability and Written Opinion dated Sep. 28, 2021.

* cited by examiner

METHOD AND SYSTEM, USING A COLORIMETRIC INDICATOR, FOR DETECTING A POSSIBLE LOSS OF INTEGRITY OF A FLEXIBLE BAG FOR BIOPHARMACEUTICAL PRODUCT

CROSS REFERENCE TO RELATED APPLICATIONS

This application is a national stage filing under section 371 of International Application No. PCT/EP2020/057801, filed on Mar. 20, 2020, published on Oct. 8, 2020 as WO 2020/200841 A1 which claims priority to European Patent Application No. 19166716.1, filed on Apr. 2, 2019. The entire disclosure of each application is hereby incorporated herein by reference.

FIELD OF THE INVENTION

The invention relates to methods and systems for detecting a possible loss of integrity of a flexible packaging intended for receiving a biopharmaceutical fluid, typically a single-use bag of flexible plastic material.

The term "biopharmaceutical fluid" is understood to mean a product resulting from biotechnology (culture media, cell cultures, buffer solutions, artificial nutrition liquids, blood products and derivatives of blood products) or a pharmaceutical product or more generally a product intended for use in the medical field. Such a product is in liquid, paste, or possibly powder form. The invention also applies to other products subject to similar requirements concerning their packaging. Such products are typically of high added value and it is important to ensure integrity of packaging where such products are contained, particularly the absence of any contamination.

BACKGROUND OF THE INVENTION

For storage and transport purposes, it is customary to place such biopharmaceutical fluids in bags having a wall made of plastic that is flexible, closed, and sterile. It is essential that such bags be fluidtight when they receive biopharmaceutical fluid and also during use of the biopharmaceutical fluid, or at least have a satisfactory level of fluidtightness, so that their possible content is preserved from any deterioration originating externally to the bag, such as contamination and/or any product loss is prevented. It is therefore necessary to be able to easily detect any loss of integrity of the bag before, during, or after use.

This is all the more necessary when the bag or pouch typically has weld lines that can be sources of leakage.

Various methods are currently known for verifying the integrity of a bag suitable for containing a biopharmaceutical fluid. A first known method consists of a physical test to determine if the wall of the bag has a leak or hole. Patent EP 2,238,425 describes a method in which the pressure inside an empty and sterile bag is increased between two plates which limit its expansion. A porous material is placed between the wall of the bag and each plate to prevent the contact of the wall and the expansion-limiting plates from concealing any leaks. The bag is inflated and then the variation of the pressure inside the bag (in a state where the bag is sandwiched/restrained between the two plates) is measured. A pressure drop inside the bag is analyzed. If there is bag leakage, in such a restrained state, the measured pressure falls over time below a given threshold, which allows concluding a loss of integrity.

Such methods may apply for a pre-use test, i.e. when the bag has not been filled with liquid (or any similar biotechnology product) yet. But a point-of-use leak test of single-use systems, during or after use, cannot be reliably performed with existing test methods used for a pre-use test.

Due to liquid/product still present in the internal volume of the flexible bag, there is a risk of blocking the defect with this residual liquid. With methods like pressure decay, a defect (loss of integrity) may be not detected.

Besides, other techniques like vacuum decay or high voltage, that are suitable to test filled containers, are very much restricted in the volume of the part under test.

There is therefore a need, in the specific field of the invention, for performing point-of-use leak tests with efficient/reliable characterization to conclude about integrity of a flexible bag.

OBJECTS AND SUMMARY OF THE INVENTION

For improving situation, embodiments of the invention provide a bag testing assembly, comprising:
  a bag containing a biopharmaceutical fluid that is at least partly liquid and having a first wall and a second wall forming two opposite walls on both sides of a longitudinal axis of the bag, the bag being flexible and having a single interior volume delimited by the two opposite wall, the biopharmaceutical fluid being contained in the single interior volume to be protected by the bag, which is closed by the two opposite walls, fluid-tight in a non-altered state, and of plastic material;
  a receiving and controlling device for receiving and controlling the bag, the device comprising at least one pressure sensor, a control unit, two plates having facing surfaces between which is interposed the bag to be controlled, the control unit comprising or being associated to a pressurizing unit or pressure source, so that the control unit can actuate and hold a restrained configuration of the bag, in which the bag is sandwiched between the two plates with a controlled pressurizing effect;
wherein the bag testing assembly further comprises an integrity/non-integrity indicator device that comprises:
  a pair of covering walls extending entirely outside the interior volume and externally covering the first wall and the second wall, in the restrained configuration of the bag, each covering wall of the pair of covering walls being configured to extend between at least one outer surface of the bag and an inner face of one of the two plates (respectively); and
  a continuous colorimetric detection layer, integral with or included in the pair of covering walls, allowing visual detection of a biopharmaceutical fluid leak through the bag by a color change.

Typically, each continuous colorimetric detection layer is included in a permeable or impregnable layer.

With such arrangement, the bag testing assembly is advantageous to perform leak detection. Also, a minimum size of leak can be detected as a correlation can be advantageously used to show that the leak size has at least the size where a leak starts to occur based on the applied pressure and the liquid characteristics. Of course, it could be much bigger as well.

The bag testing assembly is thus suitable to be used in a point-of-use method (leak test method) of assessing the integrity of a flexible plastic material of the bag, comprising:
a) wetting the flexible plastic material by filling the interior volume of the bag with a liquid of the biopharmaceutical fluid; b) pressurizing the bag in the restrained configuration, using the receiving and controlling device while the integrity/non-integrity indicator device wraps the bag or fits (typically closely fits) around the bag in a wrapping configuration of the covering walls; c) detecting a leak by inspecting if a color change is present at the continuous colorimetric detection layer.

According to a particular, the bag to be tested is either a bag having two main faces directly connected one to each other, or a 3D bag provided with gusset like walls attached to main sheets of bag material. In other words, the two plates are not necessarily forming all the plates around the bag and the wording "pair of covering walls" does not necessarily means that only these two covering walls are involved for detecting a leak by change of color.

Of course, when the filled bag is a 3D bag, at least four walls and a bottom wall are provided to form an assembly of several plates, two of which are the two plates for sandwiching the 3D bag.

In some embodiments adapted for testing a 3D bag, the receiving and controlling device comprises a parallelepiped bag holder (e.g. a palletank) including the two plates as part of a bag holder sidewall. Typically, the receiving and controlling device comprises the bag holder and a lid that is covered with a colorimetric detection layer acting as a contact layer relative to the 3D bag contained in the bag holder.

According to a particular, each continuous colorimetric detection layer is included in a permeable or impregnable layer that directly wraps the bag.

In a preferred embodiment, the control unit is linked to at least one pressure sensor and comprises the pressure source for controlling a positive pressure to be applied in the interior volume, the pressure source being controlled by the control unit that is configured to:
  generate a set value of a positive pressure, correlated with liquid characteristics representative of the biopharmaceutical fluid; and
  command a pressure adjustment device of the pressure source based on the set value, whereby the pressurizing effect is controlled.

Advantageously, the positive pressure may be a constant test pressure and can be applied for a predetermined time. This allows an integrity test to be performed in a repeatable manner. Moreover, correlation data relative to defect characterisation can be used to conclude on a certain defect size (defect size accuracy of the test) and getting reliable test results. In other words, the testing bag assembly is suitable to perform a reliable test, typically for a series of bags containing same biopharmaceutical fluid (with same liquid properties), so that it can be predicted the minimal defect size leading to a liquid passage through the bag material.

In some embodiments, the bag testing assembly comprises a Human Machine Interface (HMI) included in or connected to the control unit, the control unit being configured to:
  receive at least one setting parameter representative of a test accuracy and/or of a liquid present in the biopharmaceutical fluid, the at least one setting parameter being preferably input via the HMI interface;
  generate said set value as a function of selected correlation data that are selected amongst correlation data representative of liquid properties of a plurality of liquids, the correlation data being preferably data of a correlation table or of abacus; and
  selectively obtain the selected correlation data, based on a defect size and/or as a function of liquid properties selected as reflecting liquid properties of a liquid present in the biopharmaceutical fluid, using the at least one setting parameter.

The bag testing assembly is thus of interest to predict, for:
  different applied pressures, and
  liquid characteristics of the biopharmaceutical fluid contained in the interior volume, the defect sizes leading to a liquid passage, independently from the cause of the defect.

More generally, the bag testing assembly is provided with a control unit suitable for adjusting the test pressure (positive pressure inside the bag) as function of setting parameters, one of the setting parameters taking into account of liquid characteristics and being selected in view of the biopharmaceutical content of the bag.

Besides, it can be optionally predicted the relation to microbial ingress into the bag forming single-use system, provided that results (typically experimental results) for the characterization of defects leading to liquid leaks are available. Practically, many liquids are already characterized.

The method is entirely performed in an already filled state of the bag, without additional filling with the biopharmaceutical fluid. Filled state here simply means that the bag contains the biopharmaceutical product (the bag is not necessarily fully filled and can be optionally be drained with only residual liquid contained in the interior volume of the bag).

The pressure source provided with the pressure adjustment device is adapted to inject an additional gaseous content in the interior volume, preferably via a flexible line.

Additionally or alternatively, the control device is adapted to adjust spacing between the two plates acting as restraining plates, in the restrained configuration, so as to adjust the positive pressure inside the interior volume and/or limit expansion of the bag as regards expansion along direction perpendicular to the longitudinal axis of the bag.

Typically, one of the plates is displaced (or optionally the two plates are displaced) by operation of an appropriate actuator of the control device or similar pressurizing unit associated with the control unit.

In an optional embodiment, the two plates are sandwiching the bag by use of at least one actuator for displacing the plates in a pressurized state relative to the bag, such actuator being for instance formed as a pneumatic jack or as an electric jack. The bag may be already in contact with the at least one continuous colorimetric detection before displacing the plates.

For sterilized bags and similar single-use systems, each connection to adjust applied pressure is done through a sterile air filter. This option may be of interest to have a system with stationary plates acting as restraining plates.

In various embodiments of the bag testing assembly, one or more of the following particulars may possibly also be employed, separately or in combination:
  the bag is a pouch having a flat configuration before being filled with flowable product (the product being liquid, typically).
  the bag comprises one or more flexible lines (which are typically each connected to a sterile port included in the body of the bag) or at least one port, one of which is part of connection line for communication between the interior volume of the flexible bag and a pressure source of a pressurization system.
  the result of the test is a defect state (non-integrity) when the medium used in the continuous colorimetric detection layer has a modified optical absorption. Such medium may be Chlorophenol red, formed as an indicator dye in a permeable or impregnable layer.

the medium is changing from a first color to a second and different color upon contact with an aqueous liquid, the biopharmaceutical fluid typically containing a liquid solvent and other particles or liquid compounds. In a non-limiting example, the biopharmaceutical fluid may contain organic particles in an aqueous solvent, salts, cells of natural origin (living cells), derivatives or any mixture including an aqueous liquid as solvent.

the plates (rigid/non-deformable elements) are optionally covered with a medium with modifiable optical absorption property, typically of the colorimetric paper type, in the zone of contact with a wall of the bag filled with the biopharmaceutical fluid (liquid).

the layer including such medium typically forms the continuous colorimetric detection layer; the layer may be folded so that each of the covering walls are included in this layer.

the covering walls of the pair of covering walls are connected one to the other at a connecting part intersected by the longitudinal axis of the bag.

the covering walls belong to an assembly of at least four covering walls, preferably six covering walls when the bag to be tested is a 3D bag.

the connecting part may be an additional covering wall extending transversely relative to said pair of covering walls.

the connecting part may optionally be a bottom portion of the indicator device, formed at the opposite from a single opening of the indicator device.

the pair of covering walls are adapted to be separated from the walls of the bag after end of the test.

the pair of covering walls is part of a single element chosen amongst a flexible sock or a flexible sleeve, separate from the bag.

the covering walls of the pair of covering walls are curved in the restrained configuration.

the covering walls contain an indicator dye fixed in a continuous medium, preferably a fibrous medium, that forms the continuous colorimetric detection layer.

the continuous medium homogeneously contains Chlorophenol red or other optical sensitive compound used as indicator compound for performing the change of color, without non-reactive regions (so that color change may be reflected in any part of the continuous medium).

the continuous colorimetric detection layer (at least one layer) comprises a continuous annular portion extending around the bag.

each continuous colorimetric detection layer has an annular profile or a U-shape around the bag (of course, a J-shape profile has to be considered as a slightly deformed U-shape profile).

a combination of two colorimetric detection layers, each having a U-shape is used to form an assembly of two continuous colorimetric detection layers connected one to each other and having closed cross-section, preferably a generally oval closed cross-section.

the two plates are stationary plates.

The two plates comprise a first plate with a fixed position, and a second plate movably mounted, preferably above the first plate.

the two plates are optionally vertical plates.

one of the vertical plates has a fixed position, while the second plate is movably mounted to come closer from the first plate after placing the bag between the two plates.

the bag is a 3D bag and the two plates are horizontal plates, one of which forming a lid to be inserted in a bag holder.

the bag has an outer envelope/wall, made of a multilayer film, delimiting the single interior volume of the bag, the multilayer film comprising a polyethylene layer;

the outer wall of the bag comprises a port suitable for being closed or connected in a fluidtight and removable manner to a source of gas or fluid;

the bag is provided with a fill and/or discharge tube, which is located outside the outer envelope/wall.

the receiving and controlling device is provided with a source of pressurized gas intended to be introduced into the interior space of the bag, in a connected state of a port of the bag with a pressurizing line communicating with the source of pressurized gas.

the receiving and controlling device is provided with a pressure sensor for measuring the pressure of the gas in the interior volume.

the receiving and controlling device is provided with at least one pressure sensor fastened to one of the two plates for measuring a restraining pressure (which may be representative of a gas pressure in the interior volume), in the restrained configuration of the flexible bag.

the receiving and controlling device comprises at least one valve that is selectively open by the control unit to generate a positive pressure inside the interior volume (with such arrangement, the plates may optionally be stationary plates).

the control unit is connected to or comprises the pressure adjustment device, in order to apply, stabilize and regulate the test pressure (positive pressure inside the interior volume), based on information received from the one or more pressure sensors, regulation being preferably performed based on a set value of the positive pressure.

a predetermined test pressure is obtained in the single interior volume in said restrained configuration, the predetermined test pressure being comprised between 100 millibars and 1 bar for instance, preferably between 300 millibars and 1 bar, and being regulated using as set value of the positive pressure.

In filled configuration (3D configuration) of a 3D bag, sandwiched between at least two plates, the pressure range may be comprised between 50 millibars and 1 bar for instance; the pressure may be lower (e.g. 50 mbar) because in this configuration there might be one side of the bag unsupported. In some options, the bag holder is provided with a lid, so that the whole surface of the bag is covered by covering walls, one of which is formed as an inner layer of the lid (this may prevent having a pressure exerted onto the bag that is too low).

the plates are expansion-limiting plates that are respectively covered with linings, the continuous colorimetric detection layer being partly included in one of the linings and partly included in the other one of the linings.

According to a particular feature, the receiving and controlling device comprises one of the following arrangements:

the two plates that are constructed as separate pieces, with one of the plates slidably mounted on a slide element and movable along a sliding axis that is perpendicular to the longitudinal axis of the bag; or the two plates that are constructed as part of a bag holder of parallelepiped shape, each of the two plates being rigidly connected to a same bottom wall, each of the two plates being part of a sidewall of the bag holder.

Optionally, the bag holder (which is a rigid container) may be made of transparent material, for example transparent plastic, to allow the color change to be identified from the outside of the bag holder.

When the plates are provided with a fixed interspace, the control unit may be adapted to actuate a restrained configuration of the bag by inflating the bag. Typically, the interspace cannot vary, so that there is no difference between the interspace when starting the preparation phase and the interspace of the plates in the test phase. The plates thus can be fixed plates that passively restrain the inflated bag (with positive pressure in the interior volume). The control unit is in communication with an inert gas reservoir or similar pressure source and at least one valve is controlled and regulated by the control unit, the control unit being also configured to receive signals or data from pressure sensors.

Optionally, the pressure source is used by the control unit so that a test pressure can be applied, stabilized and regulated, the test pressure being selectively modified based on a liquid physical characteristic of the biopharmaceutical fluid. Such characteristic may be reflected by an abacus or correlation data showing decrease of minimal defect size that can be detected with increasing applied pressure (positive pressure in the interior volume of the bag containing the biopharmaceutical fluid).

The invention also relates to a test method relatively easy to be implemented at a point-of-use of a flexible bag already filled with a pharmaceutical fluid. The method can be adapted for a bag forming a single-use system, which can be fully filled, partially filled or drained with residual liquid.

It is provided, in accordance with the invention, a test method for controlling the integrity of a bag containing a biopharmaceutical fluid (typically a biopharmaceutical product forming a liquid phase or fully liquid) and having a first wall and a second wall forming two opposite walls on both sides of a longitudinal axis of the bag, the method using a receiving and controlling device comprising at least one pressure sensor, a control unit, two plates having facing surfaces between which is interposed the bag to be controlled, the bag being flexible and already filled with a biopharmaceutical fluid in a single interior volume of the bag (which is closed between the two opposite walls), fluid-tight in a non-altered state, and made of plastic material, the method comprising:

providing an integrity/non-integrity indicator device that comprises a pair of covering walls extending entirely outside the single interior volume;

associating the control unit to a pressurizing unit or pressure source, so as to actuate and hold, by the receiving and controlling device, a restrained configuration of the bag, in which the bag is sandwiched between the two plates with a controlled pressurizing effect;

externally covering the first wall and the second wall, at least in the restrained configuration of the bag, by the respective covering walls of the pair of covering walls that are configured to extend between at least one outer surface of the bag and an inner face of one of the two plates; and detecting a biopharmaceutical fluid leak through the bag, using a continuous colorimetric detection layer integral with or included in the pair of covering walls, the continuous colorimetric detection layer allowing visual detection of a biopharmaceutical fluid leak through the bag by a color change.

Typically, the restrained configuration of the bag is obtained by applying a contact pressure at two opposite faces of the bag, by bringing the bag between the two plates so that the first wall is directly in contact with a first permeable front layer forming a part of the continuous colorimetric detection layer and the second wall is directly in contact with a second permeable front layer forming another part of the continuous colorimetric detection layer, the continuous colorimetric detection layer being continuously provided with a medium having optical absorption property that changes when in contact with an aqueous liquid.

According to a preferred embodiment, a predetermined test pressure (positive pressure) is applied in the interior volume of the bag under test, such test pressure being stabilized and held for a certain test time. The test pressure and test time can be selected, using the control unit. The test pressure and test time are typically dependent on the liquid characteristics (properties of the liquid present in the bag as part or sole constituent of the biopharmaceutical product) and also dependent on the leak size (minimal defect size) to be detected.

The minimal time for the test time may be for instance of about 2 or 3 minutes. More generally, the time test may be from 2 or 3 to 60 minutes, preferably between 5 and 30 minutes, and still preferably between 9 or 10 and 20 minutes. Such test time is typically the time during which the test pressure is applied, i.e. without taking into account period dedicated to increase in positive pressure inside the interior volume.

In some options, «in-process» testing could be performed so that the bag is pressurized inside a bag holder, typically a parallelepiped rigid container, and stored or shipped for a long time. In such configuration, an evaluation of a defect could be done during any time of this storage/shipping step or just after.

More generally, it is understood that the control unit may be disconnected relative the bag. The test evaluation can only be done visually in some options.

In various embodiments of the test method (integrity test), one or more of the following particulars may possibly also be employed, separately or in combination:

a predetermined test pressure is obtained in the single interior volume in said restrained configuration, the predetermined test pressure being preferably comprised between 50 or 100 millibars and 1 bar, for instance between 250 or 300 millibars and 800 millibars.

before pressurizing the interior volume to obtain the restrained configuration, the integrity/non-integrity indicator device is configured to closely fit around the bag.

the pair of covering walls is part of a single element chosen amongst a flexible sock or a flexible sleeve, separate from the bag, the bag being provided with a tubing, the integrity/non-integrity indicator device wrapping the bag and the tubing as well.

the biopharmaceutical fluid is at least partly liquid.

the method further comprises a determination step to determine a positive pressure set value for a positive pressure to be applied in the interior volume.

the determination step is based on/depends on:

a predetermined defect size threshold reflecting a minimal defect size for a leak to be detected by the test method; and data, preferably data of a correlation table or of abacus, representative of liquid properties of the biopharmaceutical fluid.

the determination step is performed before actuating the restrained configuration of the bag, by the control unit.

the control unit is configured to adapt the positive pressure to be applied in the interior volume, based on the determination step.

the data representative of the predetermined defect size threshold may be input into the receiving and controlling device and taken into account, by using an HMI interface to which the control unit is connected.

the test method comprises, in a preparation phase:
determining, at the determination step, the positive pressure set value, which is correlated with liquid characteristics representative of the biopharmaceutical fluid, as a function of correlation data that are selected amongst correlation data representative of liquid properties of a plurality of liquids; and
generating a test time set value.

the test method comprises, in a test phase:
controlling the two plates and/or injection of a gaseous content in the interior volume of the bag, by the control unit, in order to rise pressure in the interior volume until positive pressure applied in the interior volume of the bag reaches said positive pressure set value, the bag being in said restrained configuration before reaching the positive pressure set value;
then maintaining same positive pressure; and
if no change of color is obtained on the integrity/non-integrity indicator device, after a time period at least equal to the test time set value, determining (concluding) that the flexible bag is without any defect having size superior or equal to the size threshold, and can be considered to have passed an integrity verification.

Of course, the test phase with the set positive pressure needs not to start/to be performed, should a leak be already detected before when the pressure is rising inside the bag.

According to a particular, the continuous colorimetric detection layer is in contact with walls of a bag holder of parallelepiped shape, each of the two plates being:
rigidly connected to a stationary bottom wall of the bag holder,
part of a sidewall of the bag holder.

Such configuration, with plates formed as part of parallelepiped container, is of interest, for example for bag forming pouches of high capacity, for instance with a pouch of very high capacity (at least equal to 50 L and for example at least 1000 or 1500 L).

A parallelepiped container means a 3D tank having a top opening or possibly a lateral opening. Such tank has rigid walls including the sidewall of the bag holder. The indicator device may include a continuous colorimetric detection layer that entirely covers the inner face of the bag holder sidewall, possibly except a margin area adjacent an upper opening of the bag. Complementary colorimetric detection layers are installed above the bottom wall of the bag holder and below a lid adapted to axially press the bag downwards.

Unlike previous methods, reliability can be obtained without complex calculation programs or complex pressure analysing systems. The bag is easy to be tested, without using vacuum apparatus or complicated arrangements of valves. In preferred embodiments, only one valve associated to a flexible supply line or draining line of the bag, and interposed between a pressure source and the interior volume, is used during the test method, no variation of pressure being required in the test phase.

BRIEF DESCRIPTION OF THE DRAWINGS

The figures of the drawings are now briefly described.

MORE DETAILED DESCRIPTION

A detailed description of several embodiments of the invention is provided below, accompanied with examples and with reference to the drawings.

In the various figures, the same references are used to designate identical or similar elements. For the sake of clarity, certain elements are not necessarily represented on the scale, for instance some thicknesses of layers may have been intentionally exaggerated.

Figure 8:
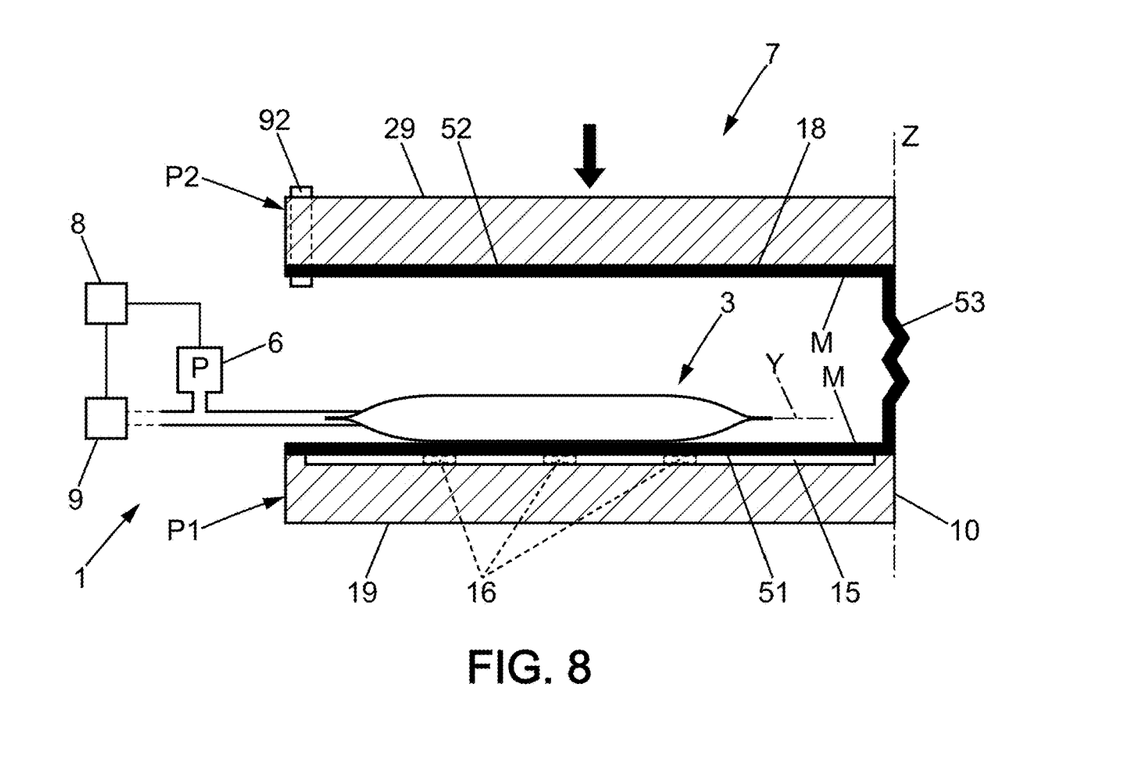
FIG. 8 schematically depicts a bag testing system, with two restraining plates (here acting as pressurizing plates) and the bag of FIGS. 1A, 1B, 1C, before the beginning of the integrity test.

The bag testing assembly 1 shown in FIG. 8 makes it possible to test the integrity of a bag 2, 3 containing a biopharmaceutical fluid F. The bag 2, 3 is only made of flexible plastic material, no metal layer (no mineral layer) being included in the bag 2, 3. The bag 2, 3 can be made of a multilayer film, preferably including a polyethylene layer that is well adapted for welding operations.

The bag 2, 3 may contain, for example, from 1 liter up to 1000 liters or 1500 liters of biopharmaceutical fluid F. The bag 2 shown in FIG. 3 may be of higher capacity. Generally, a single interior volume V is formed by the flexible bag 2, 3.

The bag testing assembly 1 is provided with a receiving and controlling device 7, that forms an enclosure where the bag 2, 3 is housed and can be pressurized, using a predetermined pressure test. As shown in FIG. 8, a control unit 8 is also provided in the assembly 1, in order to control the pressurizing effect. The bag 2, 3 is suitable to withstand a positive pressure, for example a test pressure comprised between 50 or 100 millibars and 1 bar.

Figure 3:
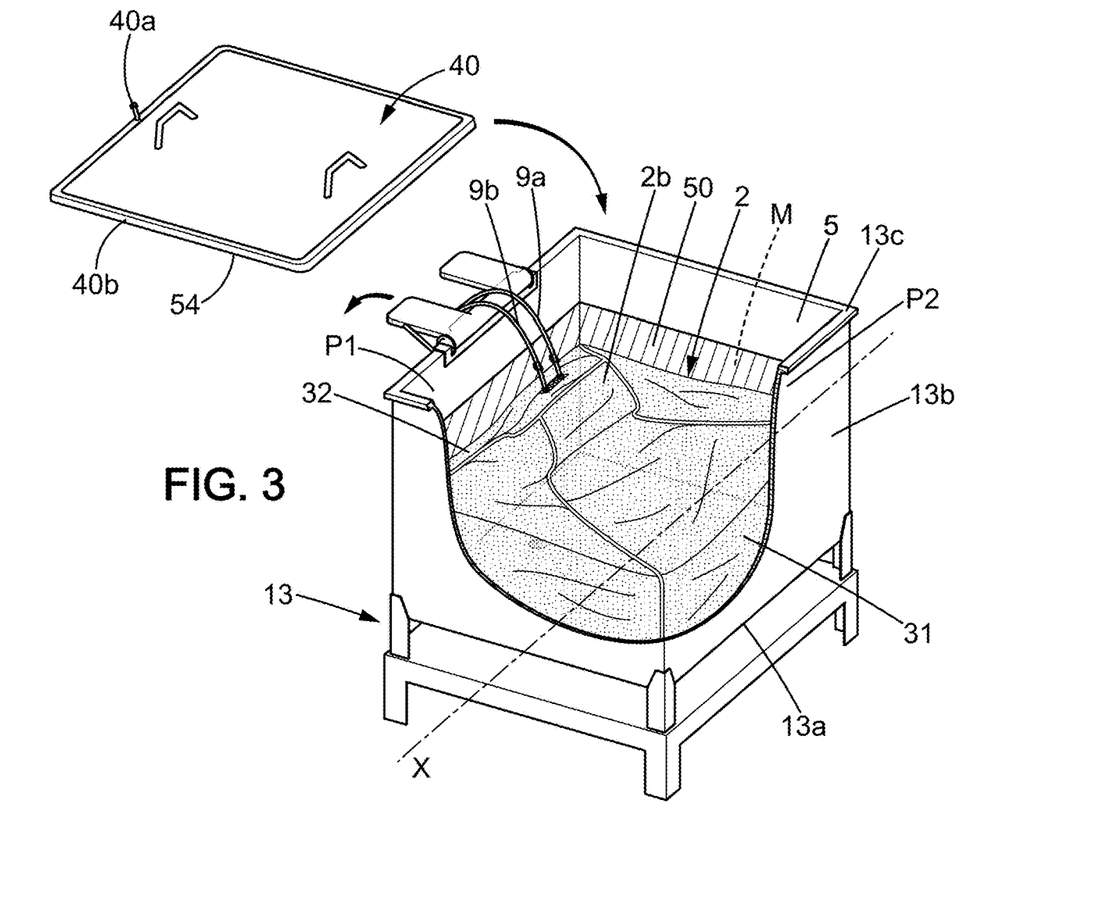
FIG. 3 is a perspective view representing a system for loading and storing a 3D flexible pouch filled with biopharmaceutical fluid, such system being provided with an annular continuous colorimetric detection layer on inner side of a bag holder sidewall and additional colorimetric detection layers for contact with a bottom and a top of the 3D flexible pouch.

Two or more plates P1, P2 may be used as constraining means, providing each a contact inner face for contact:
- with two opposite walls 31, 32 of the bag 3 in case of FIG. 8,
- with respective pairs of opposite walls (including the two opposite walls 31, 32) of the bag 2 in case of FIG. 3.

Exemplary embodiments for the bag 2, 3 will be now described, referring to FIGS. 1A, 1B, 1C and 2.

Figure 1A:
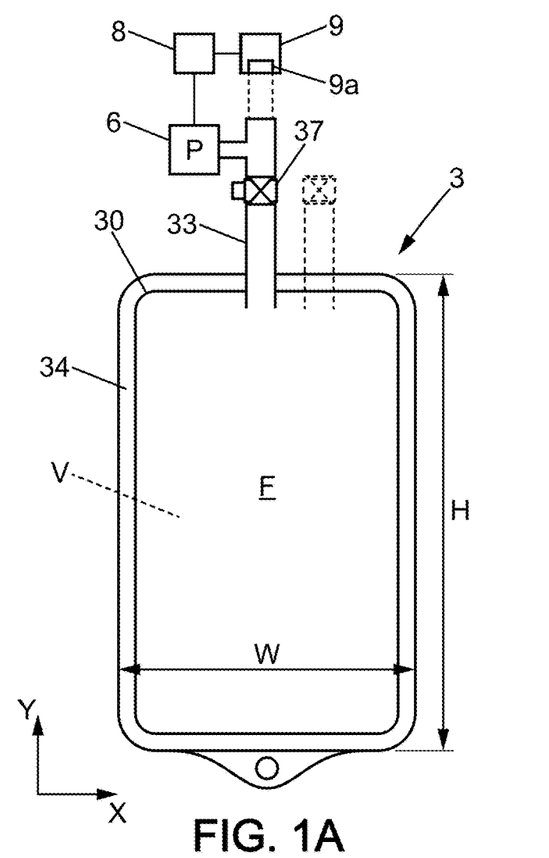
FIGS. 1A, 1B, 1C show a pouch or bag intended to be tested by an integrity test method in accordance with the invention, the bag containing a biopharmaceutical product, respectively by a front view, a side view and a top view.
Figure 1B:
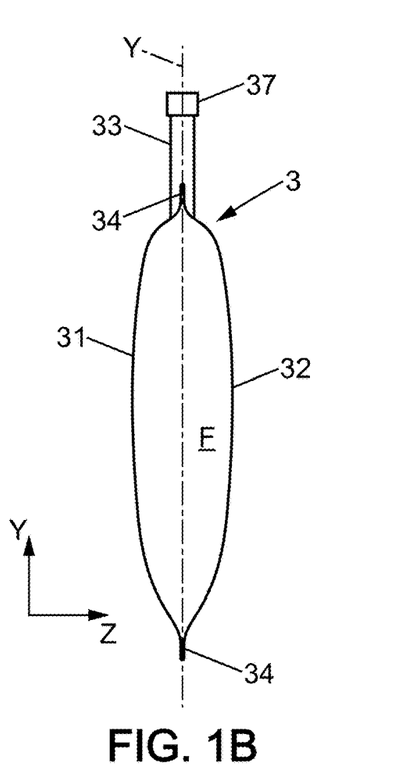
Figure 1C:
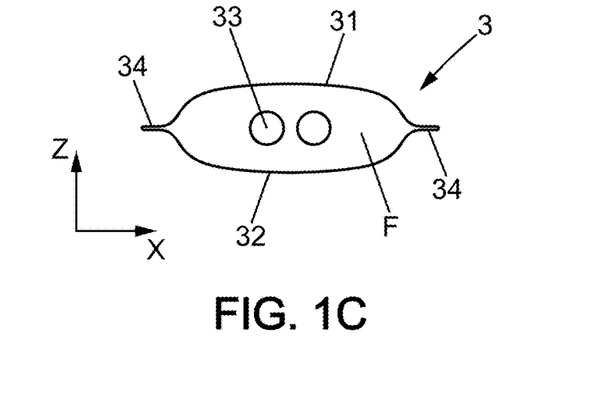
Figure 2:
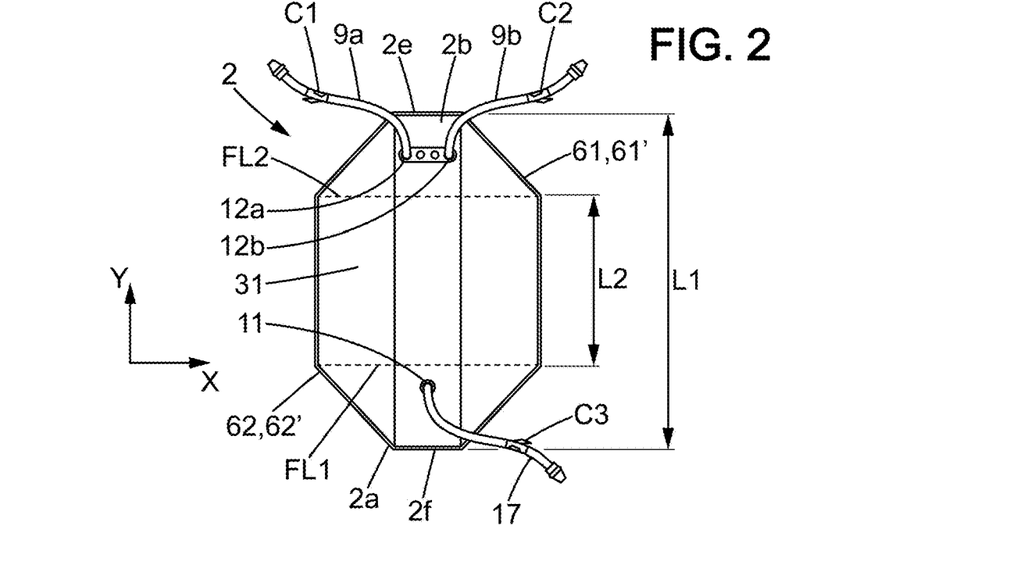
FIG. 2 is a front view of an exemplary flexible bag, in a non-filled state, that may form a device under test when performing a test method in accordance to the invention.

In the non-limiting example of FIGS. 1A-1C, a so called '2D' pouch or bag 3 is mainly formed by two walls 31, 32 of flexible plastic material arranged facing one another. The walls 31, 32 are welded together on an annular peripheral rim 34 so as to close the bag 3 tightly. The containing part 30 of the bag 3 is typically surrounded by such peripheral welding rim 34. While the peripheral rim 34 is shown with a rectangular shape in FIG. 1A, hexagonal shape may be used as illustrated in FIG. 2. More generally, it is of interest to have a bag 2, 3 that is flat in a non-filled state and provided either with two rectangular main faces (opposite faces) that may deform to have a curved shape or two main opposite faces delimited by unfolding lines that may be part of the welding rim 34. The bag 2 of FIG. 2 is also provided with gussets to have a final parallelepiped shape.

Referring to FIGS. 1A-1C, there are provided one or more ports 33 tightly connected to the bag containing part 30 to fill and/or empty the content(s) of the bag 3. Such bag 3 known as '2D' has a depth (size between the two opposite mains walls 31, 32) substantially lower than the other two dimensions width and height of the pocket. Here, the height H (along the longitudinal axis Y in FIG. 1A) of the bag 3 can range from 10 cm to 150 cm, without taking into account the hose parts that may be included in the ports 33, the width W (along the transverse axis X in FIG. 1A) of the bag 3 can range from 5 cm to 50 cm. The depth according to the third dimension, here marked Z in FIG. 1B, can range from 1 cm to 25 cm.

The testing method can also be applied to gusseted 2D bags in which the relative thickness can be substantially greater, as for example taught in EP 2238425. It is also noted that it is not excluded to apply the present invention to so-called '3D' pouches for which the depth dimension is substantially of the same order as the other two dimensions. The bags 2, 3 to be tested are single-use bioprocess bags, which are sufficiently deformable, so that the two mains walls 31, 32 can move from an unfolded/empty state of the bag where the distance (depth of the bag 2, 3) between such walls 31, 32 is substantially zero, to a state where the depth is typically superior or equal to few centimeters (possibly only one or two centimeters in case of low-capacity 2D bags).

It is also noted that it is not excluded to apply the test method to check integrity of bags having a wide variety of structure, preferably obtained by assembling two plastic sheets of flexible plastic material. Regarding the '3D' pouches or bags, their thickness dimension is substantially of the same order of magnitude as the other two dimensions.

The flexible pouch or bag 2 illustrated in FIG. 2 is a 3D bag which has, when configured in the folded state, two opposing flat faces, with ports 11 and 12a-12b being provided on one of these main faces. The two other faces are folded. The bag portions forming these two other faces are sheets of plastic material, which have the shape of flattened bellows (forming two opposite gussets) and are inserted between the two initially flat sheets or walls 31, 32 forming the opposing faces. The flat state of the flexible bag 2, as obtained immediately after manufacture, is allowed by the superposition of weld seams 61, 61' and 62, 62'. The free edges 2e and 2f may be rectilinear edges of the bag 2. Thanks to a typically hexagonal shape of the opposite faces, the bag 2 may easily reach a parallelepiped shape, by expansion of the gussets and folding along the parallel folding lines FL1, FL2 (with L1 being a distance separating the folding lines FL1, FL2 of a same plastic sheet of the bag 2). It is understood that the flat bag shown in FIG. 2 is a non-filled bag, not suitable for a point-of-use test according to the invention.

Such a bag 2 comprises a bottom wall, a top wall, and a flexible side wall which may be in two extreme states—folded flat, or unfolded and deployed—and be reshaped to change from one to the other of these states or be in any intermediate state. When the flexible bag 2 is filled with biopharmaceutical fluid (and possibly filled with gas during a test), it is inflated to a greater or lesser degree. It may form a parallelepiped bag. The unfolding of the bag 2 is performed inside an enclosure of a bag holder 5, which is a rigid container. The bag holder may be suitable for mixing or may be a tank designed for mechanical handling.

While the bottom wall of the bag 2 can rest on the inner face of the base 13a of the enclosure or inner face of a constraining plate (not shown), its side wall is deployed toward the inner face of the sidewall 13b of the enclosure of the bag holder 5. Under normal conditions, the base 13a is a lower transverse wall arranged horizontally or substantially horizontally while the sidewall 13b is upright and arranged vertically or substantially vertically, possibly flaring slightly outward from the lower transverse wall 13a. The description of FIGS. 2-3 is provided for this situation. Similar situation applies for the embodiment of FIG. 7, as the two plates P1, P2 are also arranged vertically.

The words "horizontal", "vertical", "lower", "upper", etc. are understood as being in reference to these conditions. Of course, liquid flowing outside the bag 2, 3 due to a leak will flow downwardly.

The flexible bag 2 is here illustrated as having a hexagonal shape before the unfolding/filling with a content. Each of the sheets forming the bag 2 may have a length L1 which is greater than a longer side L2 of hexagonal shape the flexible bag 2 in the non-inflated/non-filled state (shape clearly visible in FIG. 2).

This is a non-limiting example of 3D flexible pouch or bag 2. The parallel folding lines FL1, FL2 shown in FIG. 2, as obtained in inflated/filled state of the bag 2, are predetermined folding lines formed in the main opposite walls 31, 32 of the bag 2 (unlike 2D containers).

When using a large bag holder 5, a point-of-use test method for checking integrity of the bag 2 may be performed by using the bag holder 5 as a part of a receiving and controlling device 7 that further includes a control unit 8 and at least one pressure sensor 6 as shown on top of FIG. 1A. Two opposite plates P1, P2 are included in the sidewall 13b of the bag holder 5.

More generally, the receiving and controlling device 7, suitable for receiving and controlling the bag 2 or 3, comprises two plates P1, P2 having facing surfaces between which is interposed the bag 2, 3 to be controlled. Having two opposite plates P1, P2 may be sufficient to provide a restraining effect. A positive pressure in the interior volume V can be obtained without uncontrolled deformation or irregular repartition of pressure in the interior volume V.

It is understood that the length L1 of the flexible bag 2 in its initial state before filling, when measured from the lower end 2a to the upper end 2b, is greater than the height of the flexible bag or pouch 2 in its deployed and filled state (this height being substantially equal to length L2, for instance).

The flexible pouch or bag 2 has here one or more inlet or filling or supply openings, in particular in the form of ports 12a-12b (which may form upper ports), in particular in the top wall, and one or more outlet or discharge or evacuation openings, in particular in the bottom wall, in particular in the form of ports 11. The outer wall of the bag 2 thus may be provided with at least two orifices, in other words two passages, at least one for filling with a biopharmaceutical fluid, and at least one orifice for discharging the biopharmaceutical fluid.

Preferably, any line 17, 9a, 9b connected to the bag 2, here to a same face 2b of the bag 2 is referred to as a flexible supply line. Furthermore, each of flexible lines 17 and 9a-9b is preferably equipped with a clamping member such as clamp C1, C2, C3.

The inlet openings are adapted to be closed when necessary and/or a clamp member C1-C2 is used to close off access to the interior of the flexible pouch 2. Similarly, the outlet opening or openings are adapted to be open when necessary and/or a clamp member C3 is used to allow passage through the flexible line 17. The fill orifice and discharge orifice of the wall are respectively associated by fluidtight connections with fill tubes. For example, the fill orifices at the ports 12a-12b are associated to the flexible line 9a and the flexible line 9b (typically with clamps C1 and C2 shifted away from the ports 12a-12b).

Clamps C1, C2, C3 may be used to hermetically close the flexible bag 2 when placed between the two plates P1, P2, before obtaining the restrained configuration of the bag with a positive pressure. In some options, one of the clamp may be replaced by a valve, similar to valve 37 shown in FIG. 1A.

Exemplary implementations for controlling pressure to be applied in the bag, 2, 3, will be now described, referring to FIGS. 1A, 3 and 7-8 in particular.

Figure 7:
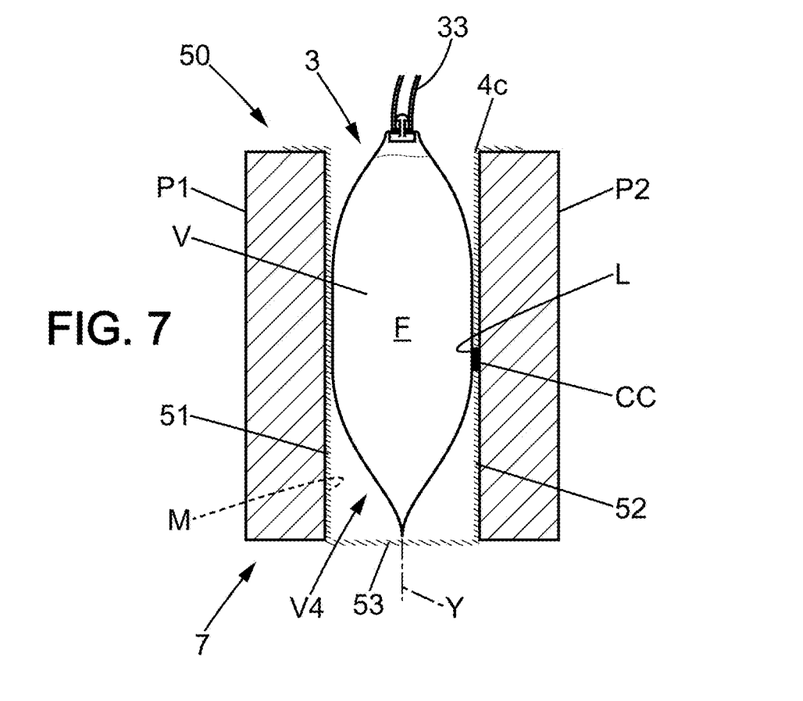
FIG. 7 is a side view of a flexible bag when the test is performed, using an exemplary variant of the integrity/non-integrity indicator device.

The plates P1, P2 may be stationary plates, forming a housing with a predetermined interspace, so that the bag 2, 3 can be received in the interspace in a filled state or pressurized state. Referring to FIG. 7, the plates P1, P2 may extend vertically, in parallel planes. Referring to FIG. 3, some plates may be vertical (see opposite plates P1, P2 provided in a sidewall of rectangular cross section) and other plates (here included in the base 13a of a bag holder 5 and in a lid 40) may extend horizontal in a sandwiched configuration of the bag 2.

With such configuration, it is provided an indicator device 50 having two mutually facing covering walls 51, 52 to be used each as an interface, extending substantially parallel to the plates P1, P2 or along the outer surfaces of the two opposite walls 31, 32 of the bag 2, 3. Preferably, the indicator device 50 also comprises a lower connecting part 53 extending between respective lower ends of the covering walls 51, 52, and forming a bottom wall of the indicator device 50.

More generally, the indicator device 50 may be provided with two covering walls 51, 52 each extended by or connected to a connecting part 53 that is intersected by the longitudinal axis Y of the bag 2, 3 when the bag is in the restrained configuration.

The bag testing assembly 1 here comprises an integrity/non-integrity indicator device 50 that is installed entirely outside the bag 2, 3, and optionally in contact with outer surfaces of the bag 2, 3 before starting the test. In such case, the indicator device 50 is preliminary fastened, for example in a wrapping configuration, to the bag 2, 3 that has already been filed with the biopharmaceutical fluid F. At least one folding line or an interconnecting wall may be provided to have the indicator device 50 made as a single element, while the covering walls 51, 52 are suitable to cover opposite outer surfaces of the bag 2, 3.

In some options, two covering walls 51, 52 of the indicator device 50 extend along the plates P1, P2, so as to be interposed between the bag 2, 3 under test and the plates P1, P2.

Whatever the option chosen for fastening the indicator device 50, such indicator device 50 is provided with a medium M changing from a first color to a second and different color upon contact with an aqueous liquid. Such medium M is in direct contact with the outer surfaces of the bag 2, 3.

Referring to FIG. 3, the indicator device 50 may comprise a band, for example an annular band, covering each outer surface of the bag 2 facing a supporting face of the holder 5. When using the bag holder 5, the inner face of the base 13a may be covered with a first lining part of the indicator device 50, while the inner face of the sidewall 13b is covered by a second lining part included in the annular band. Each of the first part and the second part includes a continuous colorimetric detection layer, in which the medium M is present to perform leak detection by a change of color. The bag 2 is introduced in the enclosure of the bag holder 5, so as to be in contact with the lining parts.

Moreover, a removable third part (not shown), made of same material as the first and second parts of the indicator device 50 may be then added to cover an upper portion of the bag 2. The removable third part of the indicator device 50 is typically an additional detection colorimetric layer 54 and may belong to a lid 40. For instance, the additional detection colorimetric layer 54, opposite to the part 53, forms the lowermost layer of the lid 40, which is of rectangular outer perimeter. In some options, the removable third part may be single piece that belongs to the lid 40 or a containment wall having a peripheral maintaining device 40b, adapted to move, expand or to be inflated (radially outwards), so as to be in a locked position engaged against a sidewall of the bag holder 5. The removable third part may be removable relative to a rigid wall part of the lid 40. An inlet 40a for air entry or introduction of similar gas may be provided in the peripheral maintaining device 40b.

The lid 40 can slidably move in the interior volume of the bag holder, for example vertically, thus allowing ease at positioning the third part of the indicator device 50 at any appropriate distance from the transverse bottom wall 13 of the bag holder 5. When the maintaining device 40b is an annular holder, the actuation of the annular holder toward an expanded state or other locking state may be performed in a configuration, in which the first part, the second part and the third part are each in contact with the bag 2, typically in wrapping contact with the bag 2, to form the indicator device 50.

As apparent in FIG. 3, the indicator device 50 may fully cover two opposite plates P1, P2 that are part of the sidewall 13b, as the second lining part is of annular shape and fits (with same shape and size) the sidewall 13b. The lining portion covering the first plate P1 forms a first covering wall 51, while the lining portion covering the second plate P2 forms a second covering wall 52. With such configuration, the rigid plates P1, P2 may restrain an expanded state of the bag 2 due to a positive pressure in the interior volume V, while not being in direct contact with the bag 2.

In a variant, the bag 2 may be surrounded by the indicator device 50 before being housed in the bag holder 5.

If there is a leak during a test phase, when a predetermined test pressure is applied in the interior volume V (the bag 2, 3 being already filled with a liquid content containing water as solvent), an active agent that is part of or impregnated in the medium M will automatically change from a first color to a second and different color upon contact with an aqueous liquid. More generally, the medium M may be any kind of medium including a molecule or compound forming a suitable colorimetric indicator, due to optical properties that can be modified when the medium M is impregnated with a liquid present inside the interior volume V. An indicator dye may be fixed in a continuous medium M, preferably a fibrous medium, forming the continuous colorimetric detection layer. Chlorophenol red may be used as the active agent of the medium M.

Referring to FIGS. 1 and 8, the control unit 8 may be a computer, a controller or any suitable electronic unit able to provide commands to modules or devices connected to the control unit 8. The control unit 8 may be provided with an HMI interface, for example a display device and conventional input means. Here, the control unit 8 is associated to a pressurizing unit or pressure source 9, so that the control unit 8 can actuate an increase in pressure inside the interior volume V.

If a valve 37 or any similar closing element (clamp C1, C2, C3 such as illustrated in FIG. 2) is provided to close access to a port 33, 12a, 12b adapted to supply a gaseous content, such valve 37 is set in an open configuration to allow the gaseous content to flow from the pressure source (source of pressurized gas, typically air, possibly inert gas such as He or N2 in some variants) to the interior volume. While the pressure is increasing, the plates P1, P2 can be stationary, such plates P1, P2 being rigid. The control unit 8 then holds a restrained configuration of the bag 2 or 3, in which the bag is sandwiched between the two plates P1, P2 with the controlled pressurizing effect.

The control unit 8, provided with the pressure source 9 and receiving information from the one or more pressure sensors 6, is capable of applying, stabilizing and regulating the test pressure. For sterilized bags 2, 3 forming single-use systems, the connection line to the pressure source 9 may be provided with a sterile air filter, typically upstream the valve 37.

The pressure sensor 6 may be arranged to communicate with a detection area where positive pressure can be measured. Optionally, other pressure sensors 16 may be used. For instance, in the receiving and controlling device 7, a gap 15 is provided between one of the covering walls 51 and the armature 10 of a plate, here the plate P1, one or more pressure sensors 16 being arranged in this gap 15.

In practice, the one or more pressure sensors 16 associated with the plate P1 may comprise a piezoelectric plate, or a flat strain gauge. Several pressure sensors 16 can be arranged along a rear surface of a covering wall 51 used for the test. Elastic spacers may also be provided for the homogeneous fastening of the covering wall to the armature 10. Pressure sensors 16 integrated in such manner, with direct fixture to the plate P1, provide a faithful image of the pressure applied to the bag 3.

Referring to FIG. 8, at least one of the plates P1, P2, for example the upper plate (here the plate P2) comprises one or more fastening members 92 for fastening the indicator device 50 to the upper plate P2. Typically, each plate P1, P2 may be provided with such fastening member.

The armature of the lower plate P1 here comprises a back face 19 which in the illustrated example will come to rest on a laboratory frame or is mounted on a frame. The armature of the upper plate P2 comprises a back face 29 that can possibly receive at least one pressurizing actuator for adjustment of the plates interspace.

Now referring to FIGS. 4, 5, 6A and 6B, when the bag 3 is provided with curved walls 31, 32 that delimit the interior volume V, the covering walls of the pair of covering walls 51, 52 may be also curved in the restrained configuration. Optionally, the indicator device 50 may be or comprise a single element, for instance a flexible sock 4 or a flexible sleeve, separate from the bag 3.

Figure 4:
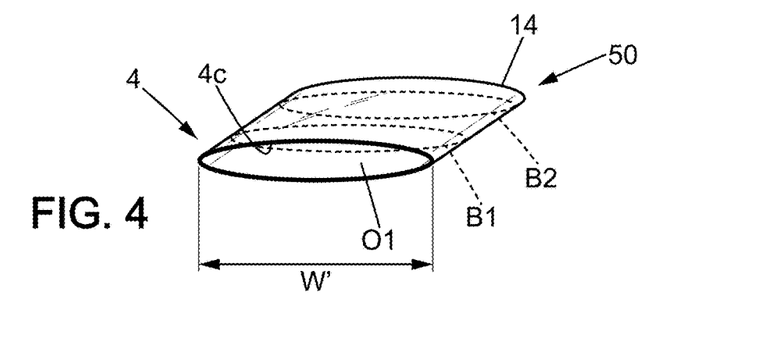
FIG. 4 is a perspective view showing a sock like integrity/non-integrity indicator device, adapted to wrap or closely fit around a bag such as illustrated in FIGS. 1A, 1B, 1C.

Such single element may be provided with an elastically deformable/resilient material, to obtain a resilient indicator device 50, able to retract after being expanded when introducing the bag 3 inside the flexible sock 4.

Typically when the flexible sock 4 is in a deformed state (partly expanded state), the bag 3 is introduced through the opening O1, here a single opening of the indicator device for inserting the bag 3 in the inner volume of the flexible sock 4. The closed end 14, at the opposite from the opening O1, forms a bottom that is typically arranged as a bottom part during the test.

The width W' of the flexible sock 4, in a default state may be similar to the width W of the bag 3, so that the flexible sock 4 is particularly suitable to house a 2D bag. A first face of the flexible sock 4 includes a contact surface 4a for contact with the first plate P1, while a second face opposite (here symmetrically opposite) to the first face of the flexible sock 4 includes another contact surface 4b for contact with the first plate P2. Such outer surfaces 4a, 4b are formed in respective wall 31, 32 of the pair of covering walls, so that the indicator device 50 remains compact, without adding significant volume in the bag testing assembly 1.

Of course, same configuration can be obtained using a sleeve open at the end opposite from the opening O1. In any case, before pressurizing the interior volume V to obtain a restrained configuration of a bag 2, 3, the integrity/non-integrity indicator device 50 may be conformed to surround the bag 2, 3, preferably by closely fitting around the bag 2 or 3.

In an alternative embodiment the sleeve or sock 4 forming the indicator device 50 may be at least one sheet or band, preferably a single-piece band provided with an overlap portion. The sleeve or sock 4 preferably includes fastening means to lock an annular or closed state of the indicator device 50. A wrapping operation of the bag 3 may be performed by fastening one end of the band, which overlies/overlaps the opposite end of the band, to have the wrapping configuration around the flexible bag 3, with the indicator device 50 forming the sleeve or sock 4. The fastening part may be at least one fastening tape provided with hook-and-loop fastening strip or similar means allowing removable fixture without tools. When there is an overlapping portion in the sleeve or sock 4, such overlapping portion may be shifted relative to the portion of the covering walls 51, 52 directly in contact with the plates P1, P2.

Figure 5:
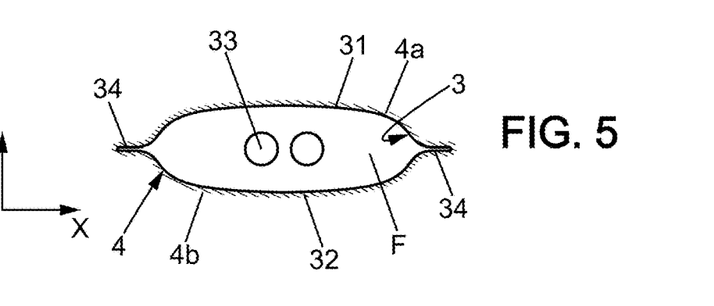
FIG. 5 is a view similar to FIG. 1C, when the bag has been wrapped by the integrity/non-integrity indicator device of FIG. 4.

Referring to FIGS. 4-5, in order to closely fit around the flexible bag 3, the sleeve or sock 4 can incorporate resilient bands B1, B2 having a biasing or compression effect onto the flexible bag 3. In a variant, it is possible to have one or more compression bands (typically separately constructed bands) surrounding the sleeve or sock 4 to have the opposite walls 51, 52 in a compressed state against the outer surfaces of the walls 31, 32 of the pocket 3.

In some embodiments, the indicator device 50 may be provided with an extension formed as an auxiliary indicator device that only covers a top face of the bag 2 or 3 and the one or more ports 33 and/or flexible lines 9a, 9b that extend here upwardly from the walls 31, 32. Optionally, the indicator device 50 may be provided with a sleeve-like or sock-like main body wrapping the bag 2, 3 and provided with an opening 4c. At least one extension is connected to the main body at a rim of the opening 4c and is suitable to cover a top face of the bag 2, 3 and/or corresponding ports or lines 17, 9a, 9b that extend externally beyond the top face (here parallel to the longitudinal axis Y).

In some embodiments, the bag 3 may be only partly wrapped by a pair of covering walls 51, 52 formed as linings on the plates P1, P2. FIG. 7 illustrates such kind of option. Use of the connecting part 53 is of interest to receive any drop of liquid that is flowing outside the bag 3 due to a leak. The indicator device 50 may be removably fastened to the plates P1, P2 of the receiving and controlling device 7.

Figure 6A:
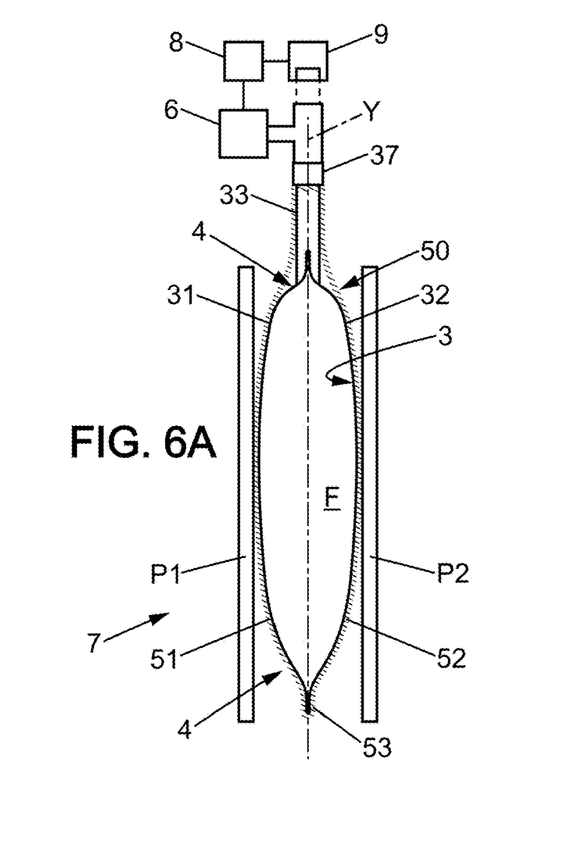
FIG. 6A is a side view similar to FIG. 1B and depicts the flexible bag when the test is performed, in a restrained configuration of the bag between two restraining plates, with the integrity/non-integrity indicator device in an operating configuration around the bag.
Figure 6B:
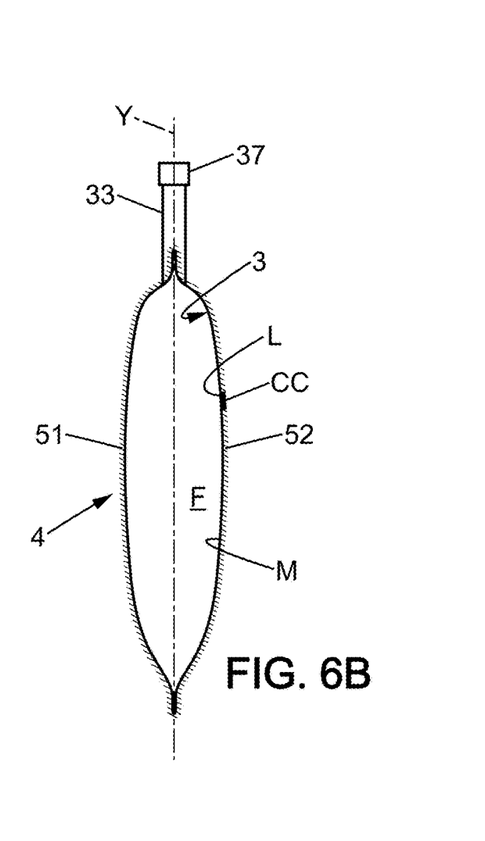
FIG. 6B, which is analogous to FIG. 6A, depicts a flexible bag having a defect wrapped in the indicator device after the test.

Referring to FIGS. 2 and 6A-6B, at least one tubing 9a, 9b, 11, 33 of the bag 2, 3 may be also wrapped by the integrity/non-integrity indicator device 50, so that a leak may be detected for the bag body and for the tubing as well. Leak L shown in FIG. 6B is detected by a color change CC of the medium M, such leak L being here observer after removing the bag 3 from the interspace or enclosure between the plates P1, P2. The sock 4 forming the indicator device 50 may be kept associated to the bag 2, 3, the sock 4 being wrapping the bag 2, 3. The color change can optionally be observed on any of the two opposite main faces of the corresponding covering wall, here the covering wall 52 of the indicator device 50. The indicator device 50 is thus able to show integrity or non-integrity of the tested bag 2, 3.

Referring to FIG. 7, if a leak L is observed, due to a color change CC, the bag 3 housed in the volume V4 or similar inner space between the plates P1, P2, is considered as not passing the integrity test performed by using the bag testing system 1. The same applies for a 3D bag 2 under test, the color change reflecting a lack of integrity.

Such leak L is observed after applying a positive pressure in the interior volume V, when a defect having a sufficient defect size (diameter or equivalent diameter of an aperture through the plastic material of the bag 2, 3) is present.

Figure 9:
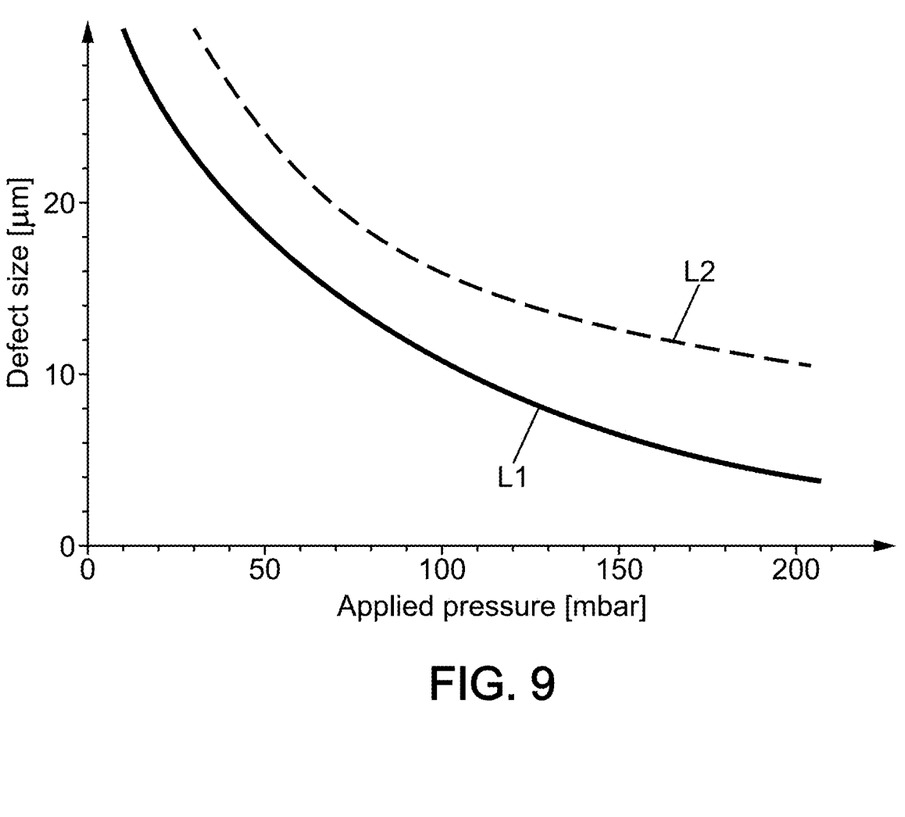
FIG. 9 is a diagram showing correlation curves allowing test pressure to be selected, depending on liquid characteristics and a minimal defect size to be detected.

FIG. 9 illustrates part of a diagram correlating a defect size that correspond to a leak, expressed in micrometers, with applied pressure (positive pressure in the interior volume V, expressed in mbar) for a same category of bags. Bags of a same category may be made of same material, with same thickness of the walls used to delimit the interior volume V. Curve L1 expresses the correlation for a first kind of liquid, while curve L2 expresses the correlation for a second kind of liquid. For a same determined defect size lower than 25 micrometers, the second liquid requires higher applied pressure as compared to the first liquid so as to be able to flow outside the bag 2, 3 and cause the medium M of the indicator device 50 to be differently colored.

By using the knowledge of such correlation data for defect characterisation, it can be concluded on a certain defect size when a same applied pressure is used, for series of bags under test filled with same kind of liquid. Reliable test results may thus be obtained.

Using a fibrous or porous detection layer, here a continuous detection layer with medium M for detection of color change, is of interest to be able to guarantee that no defect size over a defect size threshold exists for a bag 2, 3, for which no color change CC is observed. Such reliable statement for the integrity of the bag 2, 3 is preferably obtained when having an indicator device 50 designed as a sleeve or sock 4 with ability to press inwardly onto the outer surfaces of the bag 2, 3 under test.

The indicator device 50 may be single element or may include separate elements. Referring to FIGS. 7 and 8, it can be seen that the indicator device 50 may be provided with a first lining part formed as a connecting part 53 between two lining parts forming the covering walls 51, 52. In some embodiments, an actuating device may be used to displace at least one movable part and/or flexible part of the indicator device 50, for instance for allowing a contact of the medium M with any outer surface of the bag 2, 3, including any outer surface that is not in contact with the indicator device during all or part for the test time when the pressure applied in the interior volume V is equal to a set test pressure. A pinching actuation or folding actuation or any suitable movement, for driving a part of the indicator device 50, at or near the connection part 53, may be an option to have such uncovered outer surface of the bag in contact with the medium M of the indicator device 50. In such option, it is to be noted that it is of no significant interest to know exactly where the defect is present in the bag 2, 3.

More generally, it is understood that the indicator device 50 typically comprises a pair of covering walls 51, 52 extending entirely outside the interior volume V and externally covering the first wall 31 and the second wall 32, in the restrained configuration of the bag 2 or 3, so as to provide a continuous colorimetric detection layer, integral with or included in the pair of covering walls 51, 52 allowing visual detection of a biopharmaceutical fluid leak through the bag 2, 3 by the color change CC.

Referring to FIGS. 1A, 6A-6B and 7-8, some steps of a preparation phase for a test method in accordance with the invention will be described.

The test method is typically performed at the point-of-use, i.e. when the bag 2, 3 is being filled or has already been filed with biopharmaceutical fluid F. The bag 2, 3 can be fully filled, partially filled or drained with residual liquid. Liquid characteristics of the content are known, so that a test pressure set value can be selected as a positive pressure to be maintained for the test phase.

The control unit 8 of the receiving and controlling device 7 is here linked to at least one pressure sensor 6, 16 and comprises the pressure source 9. The control unit is suitable for controlling the positive pressure to be applied in the interior volume V, based on the test pressure set value. In this preferred and non-limiting embodiment, the pressure source 9 can be controlled and regulated by the control unit 8. With such arrangement, the bag testing assembly 1 may function without adjustment of the plates P1, P2, the plates passively acting as restraining plates.

The set value of a positive pressure is generated, for instance, by the control unit 8, such set value being correlated with liquid characteristics representative of the biopharmaceutical fluid F. In some options, a pressure adjustment device 9a is included in the pressure source 9 for varying a pressure level. The control device 8 is able to command the pressure adjustment device 9a based on the set value, whereby the pressurizing effect can be controlled after a pressure rising phase, during test phase. In the preparation phase, i.e. before the pressure rising phase and before the test phase with regulated pressure in the interior volume V, a HMI interface of the control unit 8 may optionally be used to input the at least one setting parameter.

In some embodiments, the control unit 8 is configured to receive at least one setting parameter representative of a test accuracy and/or of a liquid present in the biopharmaceutical fluid F. The control unit 8 is also adapted to generate the pressure test set value as a function of selected correlation data that are selected amongst correlation data representative of liquid properties of a plurality of liquids. As a setting parameter typically reflects the kind of liquid present in bags 2, 3 to be tested, the control unit 8 may select the correlation data by taking into account such information/setting parameter about the practical liquid properties of the liquid.

According to an option, the correlation data are data of a correlation table or of abacus. Such correlation may reflect data illustrated in FIG. 9, possibly for a wide range of liquids and/or for a wider range of pressures to be applied (positive pressure). The control unit 8 may be configured to selectively obtain the selected correlation data, based on a defect size and/or as a function of liquid properties selected as reflecting liquid properties of a liquid present in the biopharmaceutical fluid F, using the at least one setting parameter. A determination step can be performed in the preparation phase, during which suitable parameters are used/retrieved to allow determination of a positive pressure to be applied that matches with a sufficiently low detectable defect size. Namely, it is typically not satisfactory for final users of the bag, at the point-of-use, if a positive pressure applied in the interior volume V is too weak to detect a defect size below 20 or 25 micrometres or if the test is not reliable to conclude about integrity associated with a low defect size threshold. In some embodiments, parameters about the kind of liquid and the sufficiently low defect size threshold can be input using the control device 8. Besides, a test time set value can also be taken into account or generated by the control unit 8, depending on correlations data or based on a predetermined test time considered as sufficient for all kind of test applications.

During the preparation phase, the bag 2, 3 is placed in the interspace between the facing inner faces of the plates P1, P2. In a first option, the wall of the restraining plates P1, P2 or each plate of the bag holder 5 has an inner lining formed by the continuous detection layer of the indicator device 50. In a second option, the bag 2, 3 is already wrapped by a sleeve or sock 4 forming the indicator device 50, before starting the rise in pressure in the interior volume V. In any case, indication paper or any suitable medium M permitting a color change CC is arranged to surround or to extend with two opposite covering walls 51, 52, one facing the other. A bag chamber or enclosure is delimited between the plates P1, P2, any tubing, components and connections of the bag 2, 3 being also housed in such enclosure.

The medium M is suitable to detect any kind of liquid, e.g. by changing the color or by having any detectable change of optical properties. In some options, the change of color CC is possibly detected under modified lighting conditions that are modified as compared to natural lightning.

Regarding the steps of controlling the pressure and concluding about integrity, dependent on a color change CC due to a leak of a liquid L flowing outside the bag 2, 3 via a defect, the test method may be relatively simple as the interior volume V is simply receiving additional gaseous content from the pressure source 9. The control unit 8 allows the test pressure to be applies, stabilized and regulated. A sterile air filter may be included in the pressure source if such source contains pressurized air. This is of interest for bags that are already sterilized.

The control unit 8 holds, by the receiving and controlling device 7, the restrained configuration of the bag 2, 3 such as shown in FIGS. 3, 6A and 7. The rise in pressure is typically started when the bag 2, 3 is already sandwiched between the two plates P1, P2 or causes the bag 2, 3 to be sandwiched between the two plates P1, P2.

Actuation of the restrained configuration of the bag 2, 3, is performed by the control unit 8, once all required setting parameters are taken into account, so that the pressure to be applied is suitable to guarantee that a bag 2, 3 passing the test cannot have a defect whose size (diameter or equivalent diameter) is greater than a predetermined defect size threshold characteristic of the test, given the kind of liquid present in the interior volume V. In other words, the control unit 8 starts the test by using a set positive pressure value that is based on the determination step performed in the preparation phase.

In the test phase, the two plates and/or injection of the gaseous content in the interior volume V can be controlled by the control unit 8, in order to:
  preliminary rise pressure in the interior volume V, until positive pressure applied in the interior volume of the bag 2, 3 reaches the positive pressure set value, the bag 2, 3 being in the restrained configuration before reaching the positive pressure set value;
  then maintain same positive pressure; and
  if no change of color is obtained for the medium layer of the indicator device 50, after a time period at least equal to the test time set value, determining that the flexible bag 2, 3 is without any defect having size superior or equal to the size threshold (such as defined in the determination step or as initial parameter).

For some liquids, the test method is appropriate for detecting a leak of less than 10 or 20 µm at the point-of-use. This is of interest to detect defects occurring during transportation operations or just before a medical use or other final use of the biopharmaceutical fluid F contained in the bag 2, 3.

A temperature for the test method may be ambient temperature, between 15° C. and 25° C., without high variations of temperature. Generally, impact of temperature is relatively low and can be neglected for most of liquids. In some embodiments, the temperature may be comprised between 2 and 15° C., or between 25° C. and 35° C.

Of course, the invention is not limited to the embodiments described above and provided only as examples. It encompasses the various modifications, alternative forms, and other variants conceivable to a skilled person within the context of the invention, and in particular any combinations of the various modes of operation described above, which may be taken separately or in combination.

In particular, a flexible bag 2 may comprise more than four plastic sheets for containing the biopharmaceutical fluid, possibly with each additional sheet increasing the integrity of the bag 2 to prevent any contamination of the biopharmaceutical fluid it contains.

The invention claimed is:
1. A bag testing assembly, comprising:
  a bag containing a biopharmaceutical fluid that is at least partly liquid and having a first wall and a second wall forming two opposite walls on both sides of a longitudinal axis of the bag, the bag being flexible and having a single interior volume delimited by the two opposite walls, the biopharmaceutical fluid being contained in the single interior volume, the bag being fluid-tight in a non-altered state, and of plastic material;

a receiving and controlling device for receiving and controlling the bag, the device comprising at least one pressure sensor, a control unit, two plates having facing surfaces between which is interposed the bag to be controlled, the control unit comprising or being associated to a pressurizing unit or pressure source, so that the control unit can actuate and hold a restrained configuration of the bag, in which the bag is sandwiched between the two plates with a controlled pressurizing effect;

an integrity/non-integrity indicator device comprising:
  a pair of covering walls extending entirely outside the interior volume and externally covering the first wall and the second wall, in the restrained configuration of the bag, each covering wall of the pair of covering walls being configured to extend between at least one outer surface of the bag and an inner face of one of the two plates; and
  a continuous colorimetric detection layer, integral with or included in the pair of covering walls, allowing visual detection of a biopharmaceutical fluid leak through the bag by a color change; and
  wherein the control unit is linked to at least one pressure sensor and comprises the pressure source for controlling a positive pressure to be applied in the interior volume, the pressure source being controlled by the control unit that is configured to:
    generate a set value of a positive pressure, correlated with liquid characteristics representative of the biopharmaceutical fluid; and
    command a pressure adjustment device of the pressure source based on the set value, whereby the pressurizing effect is controlled; and
  a human machine interface included in or connected to the control unit, the control unit being configured to:
    receive at least one setting parameter representative of a test accuracy and/or of a liquid present in the biopharmaceutical fluid, the at least one setting parameter being input via the human machine interface.

2. The bag testing assembly as claimed in claim 1, wherein the control unit is further configured to:
  generate said set value as a function of selected correlation data that are selected amongst correlation data of a correlation table, the correlation data representative of liquid properties of a plurality of liquids; and
  selectively obtain the selected correlation data, based on a defect size and/or as a function of liquid properties selected as reflecting liquid properties of a liquid present in the biopharmaceutical fluid, using the at least one setting parameter.

3. The bag testing assembly as claimed in claim 1, wherein the covering walls of the pair of covering walls are connected one to the other at a connecting part intersected by the longitudinal axis of the bag.

4. The bag testing assembly as claimed in claim 1, wherein the pair of covering walls are part of a single element chosen amongst a flexible sock or a flexible sleeve, separate from the bag.

5. The bag testing assembly as claimed in claim 1, wherein the covering walls of the pair of covering walls are curved in the restrained configuration and contain an indicator dye fixed in a continuous medium, the continuous medium forming the continuous colorimetric detection layer.

6. A test method for controlling the integrity of a bag containing a biopharmaceutical fluid and having a first wall and a second wall forming two opposite walls on both sides of a longitudinal axis of the bag, the method using a receiving and controlling device comprising at least one pressure sensor, a control unit, two plates having facing surfaces between which is interposed the bag to be controlled, the bag being flexible and already filled with a biopharmaceutical fluid that is at east partly liquid in a single interior volume of the bag, the bag being fluid-tight in a non-altered state, and made of plastic material, the method comprising:
  providing an integrity/non-integrity indicator device that comprises a pair of covering walls extending entirely outside the single interior volume;
  determining a positive pressure set value for a positive pressure to be applied in the interior volume, the determination step based on a predetermined defeat size threshold reflecting a minimal defect size for a leak to be detected by the test method;
  associating the control unit to a pressurizing unit or pressure source, so as to actuate and hold, by the receiving and controlling device, a restrained configuration of the bag, in which the bag is sandwiched between the two plates with a controlled pressurizing effect;
  externally covering the first wall and the second wall, at least in the restrained configuration of the bag, by the respective covering walls of the pair of covering walls that are configured to extend between at least one outer surface of the bag and an inner face of one of the two plates; and
  detecting a biopharmaceutical fluid leak through the bag, using a continuous colorimetric detection layer integral with or included in the pair of covering walls, the continuous colorimetric detection layer allowing visual detection of a biopharmaceutical fluid leak through the bag by a color change.

7. The test method as claimed in claim 6, wherein the restrained configuration of the bag is obtained by applying a contact pressure at two opposite faces of the bag, by bringing the bag between the two plates so that the first wall is directly in contact with a first permeable front layer forming a part of the continuous colorimetric detection layer and the second wall is directly in contact with a second permeable front layer forming another part of the continuous colorimetric detection layer, the continuous colorimetric detection layer being continuously provided with a medium having optical absorption property that changes when in contact with an aqueous liquid.

8. The test method as claimed in claim 6, wherein a predetermined test pressure is obtained in the single interior volume in said restrained configuration, the predetermined test pressure being between 100 millibars and 1 bar.

9. The test method as claimed in claim 6, wherein before pressurizing the interior volume to obtain the restrained configuration, the integrity/non-integrity indicator device contacting the bag.

10. The test method as claimed in claim 9, wherein the pair of covering walls are part of a single element chosen amongst a flexible sock or a flexible sleeve, separate from the bag, the bag being provided with a tubing, the integrity/non-integrity indicator device wrapping the bag and the tubing as well.

11. The test method as claimed in claim 6, wherein the determining the positive pressure set value for the positive pressure to be applied in the interior volume further comprises:

determining the positive pressure set value for the positive pressure to be applied in the interior volume based on data of a correlation table, the data representative of liquid properties of the biopharmaceutical fluid.

12. The test method as claimed in claim 11, wherein the determination step is performed, before actuating the restrained configuration of the bag, by the control unit, which is configured to adapt the positive pressure to be applied in the interior volume based on the determination step, and wherein data representative of the predetermined defect size threshold are input into the receiving and controlling device and taken into account, by using a human machine interface.

13. The test method as claimed in claim 11, comprising:
in a preparation phase:
determining, at the determination step, the positive pressure set value, which is correlated with liquid characteristics representative of the biopharmaceutical fluid, as a function of correlation data that are selected amongst correlation data representative of liquid properties of a plurality of liquids; and
generating a test time set value;

and in a test phase:
controlling the two plates and/or injection of a gaseous content in the interior volume of the bag, by the control unit, in order to rise pressure in the interior volume until positive pressure applied in the interior volume of the bag reaches said positive pressure set value, the bag being in said restrained configuration before reaching the positive pressure set value;
then maintaining same positive pressure; and
if no change of color is obtained on the integrity/non-integrity indicator device, after a time period at least equal to the test time set value, determining that the flexible bag is without any defect having size superior or equal to the size threshold and can be considered to have passed an integrity verification.

14. The test method as claimed in claim 6, wherein the continuous colorimetric detection layer is in contact with walls of a bag holder of parallelepiped shape, each of the two plates being:
rigidly connected to a stationary bottom wall of the bag holder,
part of a sidewall of the bag holder.

15. The bag testing assembly as claimed in claim 5, wherein the continuous medium further comprises a fibrous medium.

* * * * *